United States Patent [19]

Hsu et al.

[11] Patent Number: 5,283,687
[45] Date of Patent: Feb. 1, 1994

[54] AMPLIFIER FOR OPTICAL FIBER COMMUNICATION LINK

[75] Inventors: Hai-Pin Hsu, Northridge; Ronald B. Chesler, Woodland Hills; Gregory L. Tangonan, Oxnard, all of Calif.

[73] Assignee: Hughes Aircraft Company, Los Angeles, Calif.

[21] Appl. No.: 929,193

[22] Filed: Oct. 1, 1992

Related U.S. Application Data

[62] Division of Ser. No. 655,615, Feb. 15, 1991, abandoned.

[51] Int. Cl.$^5$ ............................................. H04B 10/24
[52] U.S. Cl. ..................................... 359/341; 359/373
[58] Field of Search .................................. 359/341, 373

[56] References Cited

U.S. PATENT DOCUMENTS

| | | | |
|---|---|---|---|
| 4,554,510 | 11/1985 | Shaw et al. | 359/341 |
| 4,750,036 | 6/1988 | Martinez | 358/147 |
| 4,878,726 | 11/1989 | Fatehi | 359/341 |
| 4,989,201 | 1/1991 | Glance | 359/341 |
| 5,005,936 | 4/1991 | Hsu | 359/373 |
| 5,058,974 | 10/1991 | Mallenauer | 359/341 |
| 5,077,728 | 12/1991 | Kamino | 359/124 |
| 5,140,456 | 8/1982 | Huber | 359/341 |

*Primary Examiner*—Nelson Moskowitz
*Attorney, Agent, or Firm*—Randall M. Heald; Charles D. Brown; Wanda K. Denson-Low

[57] ABSTRACT

A bidirectional optical fiber (12) amplifier suitable for use in a dual payout fiber-optic communication link (10) is disclosed herein. The inventive amplifier (12) is typically encased in a shell or service loop, and is preferably connected between first and second optical fiber segments (18 and 20). The amplifier (12) includes a pump laser (102) for generating optical energy of a first wavelength. A wavelength selective optical coupler (82), in optical communication with the first fiber segment (18) and the pump laser (102), combines optical energy propagating through the first fiber segment (18) with the optical output of the pump laser (102). The amplifier (12) of the present invention further includes a doped optical fiber (114), optically connected between the wavelength selective optical coupler (82) and the second optical fiber segment (20), for amplifying optical energy within a predetermined wavelength spectrum passing therethrough. The inventive amplifier (12) may be advantageously employed within certain fiber-optic communication links in order to enhance optical signal strength.

3 Claims, 2 Drawing Sheets

AMPLIFIER FOR OPTICAL FIBER COMMUNICATION LINK

This is a division of application Ser. No. 655,615, filed Feb. 15, 1991, now abandoned.

BACKGROUND OF THE INVENTION

1. Field of the Invention:

This invention relates to fiber-optic communication systems. More specifically, this invention relates to optical amplification arrangements for fiber-optic communication systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art:

In certain remote-guidance systems, communication with a guided vehicle is facilitated by an optical fiber link between the vehicle with a control station. The optical fiber is typically wound around a bobbin, or secured by other means capable of dispensing the fiber as the vehicle travels downrange. An optical carrier of a first wavelength is used to transport commands from the control station to the vehicle, while data from the vehicle is impressed upon an optical carrier of a second wavelength and carried by the fiber to the control station. Hence, bidirectional communication is effectuated in conventional fiber-optic systems by using optical energy at a pair of wavelengths to carry information in opposing directions.

Unfortunately, signal loss induced by the connecting fiber is typically minimized only at relatively long optical wavelengths. Since the optical carriers propagating in opposite directions along the link must generally be separated by a sufficient wavelength spacing to prevent inter-channel interference (cross-talk), it is generally not possible to choose the wavelength of both carriers to be within the relatively narrow wavelength spectrum of minimal signal loss. Accordingly, the signal transmission range of conventional dual-wavelength bidirectional optical fiber communication links is less than would be possible for a fiber link operative within a wavelength spectrum of minimal signal loss.

Fiber-induced signal loss generally necessitates intermediate amplification in long range systems. However, in conventional dual wavelength systems complex and expensive optical repeaters are used for signal amplification. Optical repeaters operate by first converting the signals carried by the light energy back to the electrical domain. Next, these extricated electrical signals are superimposed upon a separately generated optical carrier. In addition, optical repeaters complicate system design as these circuits often need to be included at multiple locations in very long-range fiber-optic links.

It follows that a need in the art exists for an optical amplifier suitable for use in a long-range fiber-optic communication link, wherein the amplifier is operative over an optical spectrum of minimal fiber-induced signal loss.

SUMMARY OF THE INVENTION

The need in the art for a bidirectional optical amplifier suitable for use in a fiber-optic communication link is addressed by the optical fiber amplifier of the present invention. The inventive amplifier is preferably connected between first and second optical fiber segments, and includes a pump laser for generating optical energy of a first wavelength. An optical coupler, in optical communication with the first fiber segment and the pump laser, combines optical energy propagating through the first fiber segment with the optical output of the pump laser. The amplifier of the present invention further includes a doped optical fiber, optically connected between the optical coupler and the second optical fiber segment, for amplifying optical energy within a predetermined wavelength spectrum passing therethrough. The inventive amplifier may be advantageously employed within certain fiber-optic communication links in order to enhance optical signal strength.

DETAILED DESCRIPTION OF THE INVENTION

Figure 1:
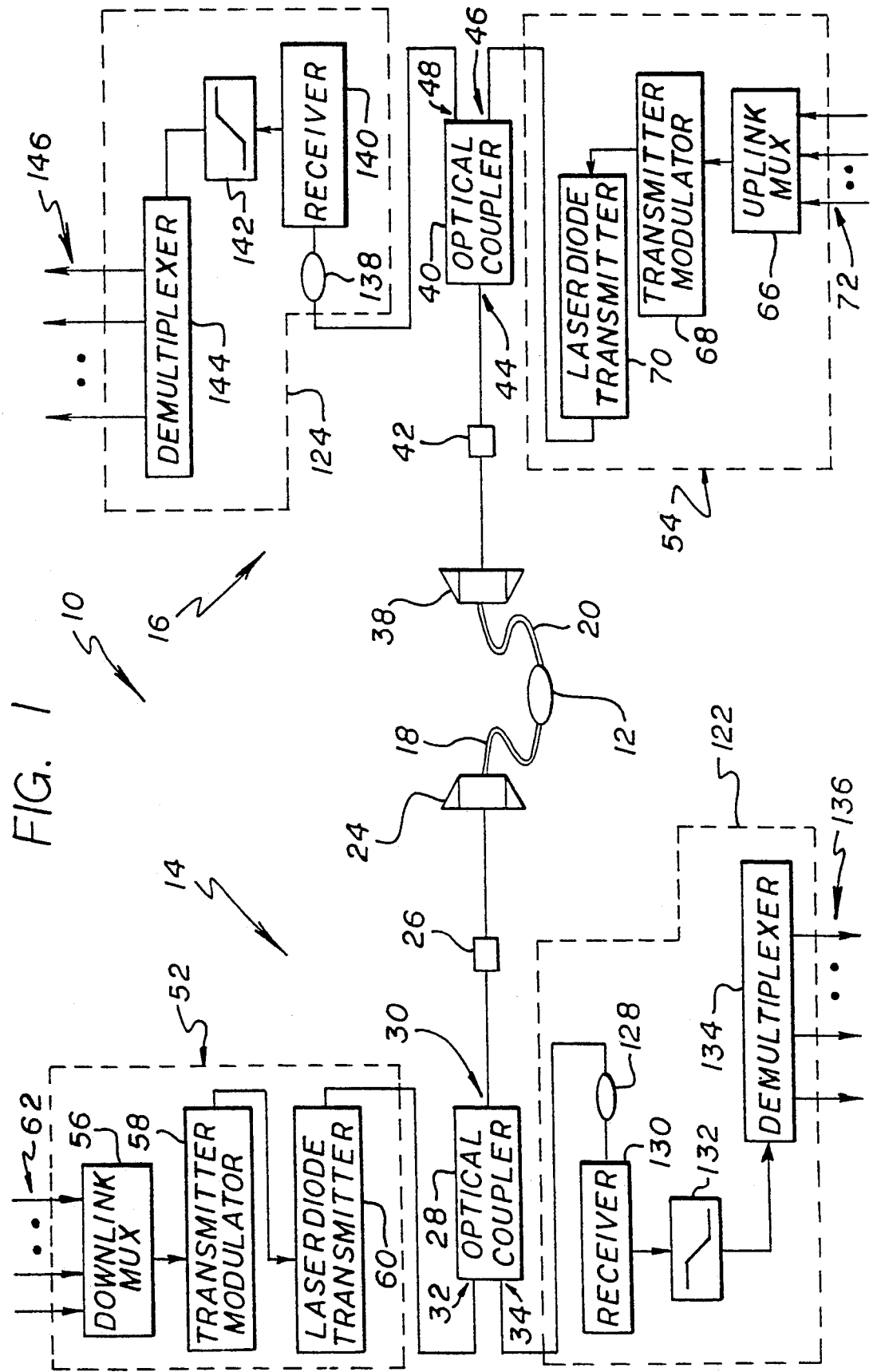
FIG. 1 shows a block diagrammatic representation of a single wavelength bidirectional optical fiber communication link utilizing an optical fiber amplifier of the present invention.

A single wavelength bidirectional optical fiber communication link 10, utilizing an optical fiber amplifier 12 of the present invention, is shown in the block diagrammatic representation of FIG. 1. The link 10 includes the optical fiber amplifier 12 of the present invention. The amplifier 12 is operative to facilitate long-range communication between a vehicle subsystem 14 and control station subsystem 16, and is connected between first and second optical fiber segments 18 and 20. The fiber segments 18 and 20 transmit an optical carrier in each direction, with each carrier centered at a wavelength W—preferably a wavelength at which the optical signal loss induced by the fiber segments 18 and 20 is minimal. These oppositely traveling optical carriers support signals within a first frequency spectrum sent from the vehicle 14 to the control station 16 and carry signals sent in the reverse direction within a well-segregated, substantially non-overlapping second frequency spectrum. The manner in which the communication link 10 provides a pair of oppositely-traveling, modulated optical carriers is described immediately below in order to clarify discussion of the inventive amplifier 12.

As shown in FIG. 1, a first bobbin 24 is connected to the first optical fiber segment 18 at one end thereof, and is attached to the vehicle subsystem 14 by a first optical fiber connector 26. The optical fiber segment 18 is initially wound around the bobbin 24 and is dispensed therefrom as the vehicle 14 moves away from the control station 16. The connector 26 allows the passage of light energy between the bobbin 24 and an optical fiber directional coupler 28. The fiber coupler 28 has first, second and third ports 30, 32, and 34, respectively, and is disposed to split optical power entering the first port 30 between the second and third ports 32 and 34. In commercially available fiber optic couplers, optical energy incident on a second port is attenuated by approximately 60 to 70 dB upon reaching a third port thereof.

The second optical fiber segment 20 is optically connected to a second bobbin 38, with the bobbin 38 being attached to a control station optical fiber directional coupler 40 through a second optical fiber connector 42. Again, the second optical fiber segment 20 is initially wound around the bobbin 38, and is dispensed therefrom as the vehicle 14 moves away from the control station 16. The connector 42 allows the passage of light energy between the bobbin 38 and the coupler 40. The coupler 40 is substantially identical to the coupler 28 and has first, second and third ports 44, 46, and 48 respectively. Optical power entering the first port 44 is split between the second and third ports 46 and 48.

Disposed within the vehicle subsystem 14 and control station 16 are first and second transmit sections 52 and 54, respectively. The first transmit section 52 includes a downlink multiplexer 56, a transmitter modulator 58, and a laser diode transmitter 60. The multiplexer 56 accepts input from a multiple channel data bus 62 and outputs a multiplexed electrical signal to the modulator 58. The modulator 58 includes circuitry for generating a digital waveform of a known frequency in response to the data stream from the multiplexer 56. For example, it may be desired to translate a 100 Mb/s data rate from the multiplexer 56 into a digital waveform having a frequency of 4 GHz. In this instance the digital waveform would be synthesized by the modulator 58 by frequency modulating a 4 GHz analog signal across a first frequency spectrum (e.g. 3.8 MHz to 4.2 GHz). The digital waveform from the modulator 58 is used to modulate the wavelength of an optical carrier, centered at a wavelength W of minimal fiber-induced signal loss, produced by a laser diode or light emitting diode within the laser diode transmitter 60. In the illustrative representation of FIG. 1, the transmitter 60 includes an InGaAsP. laser diode operative at a wavelength W of 1550 nm. The modulated optical carrier is then launched onto the first optical fiber segment 18 via the fiber coupler 28. In this manner an analog or digital downlink signal D confined to a first frequency spectrum is transmitted from the vehicle subsystem 14 to the control station subsystem 16 by modulating an optical carrier about the wavelength W.

Similarly, the second transmit section 54 includes a control station uplink multiplexer 66, a control station transmitter modulator 68, and a control station laser diode transmitter 70. Again, the multiplexer 66 accepts input from a multiple channel data bus 72 and outputs a multiplexed electrical signal to the modulator 68. The modulator 68 includes circuitry for generating a digital waveform of a known frequency in response to the data stream from the multiplexer 66. For example, it may be desired to translate a 1 Mb/s data rate from the multiplexer 66 into a digital waveform having a frequency of 1 Ghz. In this instance the digital waveform would be synthesized by the modulator 68 by frequency modulating a 1 Ghz analog signal across a second frequency spectrum (e.g. 800 MHz to 1.2 GHz). The digital waveform from the modulator 68 is used to modulate the wavelength of an optical carrier centered at the wavelength W produced by a laser diode or light emitting diode within the laser diode transmitter 70. Accordingly, the transmitter 70 also includes an InGaAsP laser diode operative at a wavelength of 1550 nm. The modulated optical carrier is then launched onto the second optical fiber segment 20 via the fiber coupler 40. In this way an analog or digital uplink signal U confined to a second frequency spectrum—distinct from the first frequency spectrum—is transmitted from the control station subsystem 16 to the vehicle subsystem 14 by modulating an optical carrier about the wavelength W.

Figure 2:
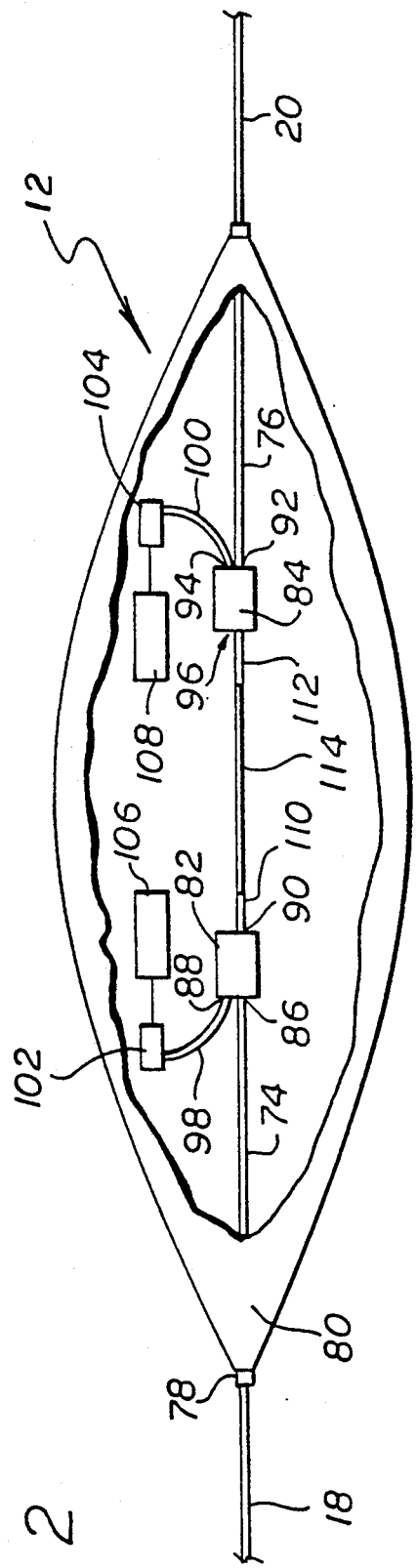
FIG. 2 is a exposed side view of the optical fiber amplifier of the present invention.

FIG. 2 is a sectional side view of the optical fiber amplifier 12 of the present invention. As is described below, the amplifier 12 includes an optical fiber with a rare earth ion doped core. The doped fiber, when excited by optical energy from pump lasers coupled thereto, is operative to amplify the modulated optical carriers propagating in either direction between the vehicle 14 and control station 16. As shown in FIG. 2, the amplifier 12 is encased within a molded plastic or metallic shell 80, generally referred to as a service loop, and is connected between the first and second optical fiber segments 18 and 20. The shell 80 is typically includes filler material which serves to physically support the components included within the amplifier 12. The first and second fiber segments 18 and 20 are spliced to third and fourth optical fiber segments 74 and 76 contained within the shell 80. These splices are preferably supplemented with conventional fiber strength relief 78.

The modulated optical carriers from the vehicle 14 and control station 16 are fed to first and second 3-port wavelength selective optical couplers 82 and 84 via the third and fourth fiber segments 74 and 76. The first coupler 82 includes primary, secondary and tertiary ports 86, 88, and 90. Similarly, the second coupler 84 has a set of primary, secondary and tertiary ports 92, 94, and 96. The secondary ports 88 and 94 of the first and second optical couplers 82 and 84 are conventionally connected by fifth and sixth optical fiber segments 98 and 100 to first and second pump lasers 102 and 104. In the embodiment of FIG. 2, the pump lasers 102 and 104 may be realized by commercially available laser diodes which are operative at either 980 or 1480 nm., and are capable of delivering +10 dbm optical output power. These wavelengths are within the absorption band of the rare-earth ion dopants operative to generate energy inversion for signal amplification. The pump lasers 102 and 104 are driven by electrical current supplied by first and second laser drivers 106 and 108. Each of the drivers 106 and 108 is powered by a battery and includes circuitry suitable for generating a current to excite the pump lasers 102 and 104.

The tertiary ports 90 and 96 of the first and second couplers are connected to first and second optical fiber coupling segments 110 and 112. The coupling segments place a doped fiber amplifying segment 114 in optical communication with the tertiary coupler ports 90 and 96. In the embodiment of FIG. 2, the doped fiber segment 114 consists of an optical fiber in which the core has been doped with erbium (Er) ions at an appropriate concentration, in the range of 50 to 1,000 ppm. Such concentrations are known to facilitate amplification by stimulated emission of radiation.

Optical energy routed to the doped fiber 114 from the pump lasers 102 and 104 via the couplers 82 and 84 places the erbium ions within the doped core in an excited state. In embodiments wherein the doped fiber includes a dopant other than erbium, e.g. neodymium (Nd), the wavelength of the pump lasers 102 and 104 is adjusted to induce similar ionic excitation. During propagation of the modulated optical carriers from the vehicle 14 and control station 16 through the doped fiber 114, energy is transferred from the Erbium ions in the excited state to the electromagnetic field at the wavelength of the signal carrier. In this manner the amplifier 12 of the present invention amplifies optical energy propagating in either direction between the first and second optical fiber segments 18 and 20.

The optimal length of the doped fiber 114 depends on the desired degree of optical amplification, which varies as a function of the optical power delivered by the pump lasers 102 and 104 and the doping level of the rare-earth element in the core region of the fiber 114. For example, assuming the aforementioned doping concentration and an optical output of +10 dbm from the pump lasers 102 and 104, the length of the doped fiber 114 will generally be chosen to be between ten and fifty meters. In the representation of FIG. 1 the doped fiber 114 may be designed to effect optical amplification over a relatively narrow wavelength band, since in the frequency division multiplexing scheme described herein both the uplink and downlink signals are transmitted via an optical carrier centered at a wavelength W of minimum fiber-induced signal loss. Nonetheless, in order to enhance isolation between the uplink and downlink signals it may be desired to transmit each signal via optical carriers of differing wavelength. In such a dual-wavelength transmission system optical carriers will preferably be selected from within a wavelength spectrum in which the fiber-induced signal loss is acceptably low. For example, the embodiment of the amplifier 12 described herein would be suitable for inclusion in a communication link utilizing oppositely-directed optical carriers having wavelengths of 1540 and 1560 nm.

The remainder of the communication link 10 will now be described with reference to FIG. 1. Disposed within the vehicle subsystem 14 and the control station subsystem 16 are first and second receive sections 122 and 124, respectively. The first receive section 122 includes a first receiver optical preamplifier 128 substantially identical to the amplifier 12. The preamplifier 128 amplifies the optical uplink signal routed thereto from the optical coupler 28. Coupled to the preamplifier 128 is a first optical receiver 130, which includes a photodetector for generating an electrical signal in response to the incident optical waveform. The electrical signal from the photodetector is next routed to a first filter circuit 132 having a passband within the second frequency spectrum, and having a stopband which includes the first frequency spectrum. The receiver 130 and associated filter 132 are thus designed to recover the uplink signal U from an optical carrier and to suppress signals, including the downlink signal D, having spectral components outside of the second frequency spectrum. The recovered uplink signal U is then passed through a demultiplexer 134 and impressed on a vehicle data bus 136.

The second receive section 124 within the control station 16 is similarly configured. Specifically, the second receive section 124 includes a second receiver optical preamplifier 138 substantially identical to the amplifier 12. The preamplifier 138 amplifies the optical downlink signal routed thereto from the optical coupler 40. Coupled to the preamplifier 138 is a second optical receiver 140 which includes a photodetector for generating an electrical signal in response to the amplified optical uplink signal. The electrical signal from the photodetector is next routed to a second filter circuit 142 having a passband within the first frequency spectrum, and a stopband which includes the second frequency spectrum. The receiver 138 and filter 142 are thus designed to recover the downlink signal D from an optical carrier and to suppress signals, including the uplink signal U, having spectral components outside of the first frequency spectrum. Next, the recovered downlink signal is separated into constituent components by a demultiplexer 144 and passed to a control station data bus 146 coupled thereto.

Figure 3:
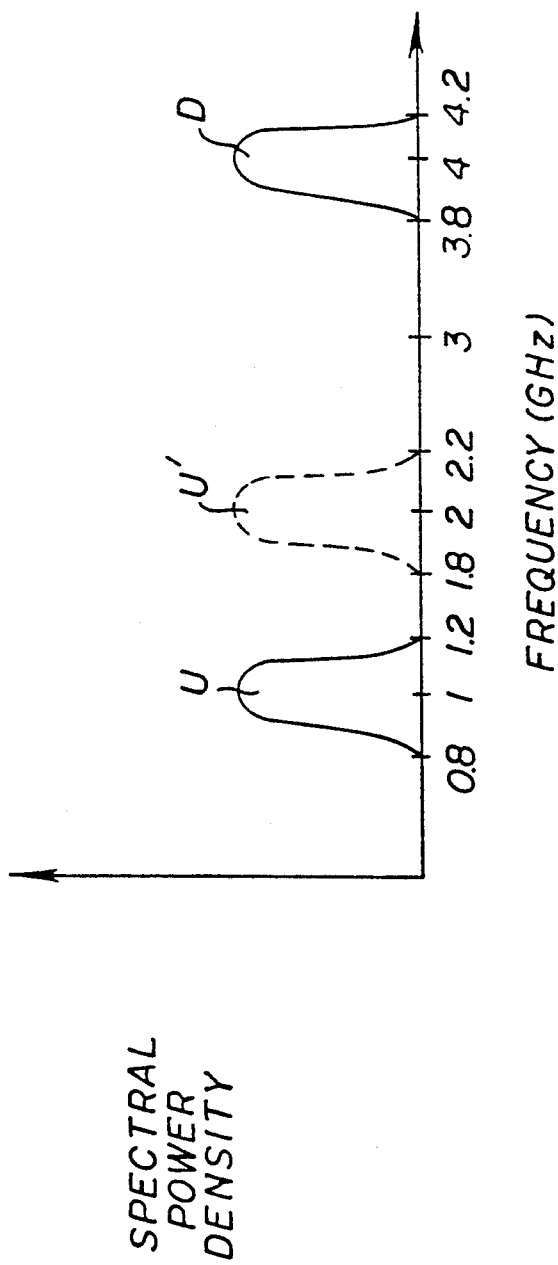
FIG. 3 is a graphical representation of the spectral power densities of an uplink signal U and downlink signal D as a function of frequency.

FIG. 3 graphically represents the spectral power densities of the uplink signal U and downlink signal D as a function of frequency. As mentioned above, the uplink and downlink signals are encoded on two digital channels having a relatively large data rate difference. Although the respective frequency spectra of the uplink and downlink signals may partially overlap, it is evident from FIG. 3 that the power density distributions thereof remain well-segregated. As a consequence, bandpass filters may be utilized to filter desired proportions of the uplink and downlink signals at the receivers 130 and 140. This power density segregation enables the uplink U and downlink D signals to be transmitted through the amplifier 12 by optical carriers centered at a common wavelength without engendering signal crosstalk.

Moreover, additional communication channels may conveniently be added to the system 10. For example, as shown in FIG. 3 a second uplink channel (signal) U' centered at 2 GHz and extending from 1.8 GHz to 2.2 GHz could be added to the system 10 without interfering with signals in the uplink U or original downlink D frequency bands. This addition simply requires that the passband of the filter 142 included within the control station receive section 124 be extended to 2.2 GHz, and that the stopband thereof exhibit sufficient rejection at 2.2 GHz.

While the present invention has been described herein with reference to a particular embodiment, it is understood that the invention is not limited thereto. The teachings of this invention may be utilized by one having ordinary skill in the art to make modifications within the scope thereof. For example, the inventive amplifier is not limited to a configuration employing a pair of pump lasers. While superior amplification characteristics may be obtained from such an arrangement, other embodiments of the present invention may include only a single pump laser. Similarly, dopants other than erbium (Er) may be included in the core of doped fibers utilized in alternative embodiments of the present invention. In addition, the amplifier of the present invention is not limited to inclusion in bidirectional communication links of the type shown in FIG. 1. Those skilled in the art may know of additional applications wherein the optical amplification effected by the present invention would be of significant utility.

Accordingly,
What is claimed is:

1. A bidirectional communication link comprising:
an optical fiber having a first and a second end, said optical fiber including first and second fiber segments;
first means for launching a first optical carrier of a first wavelength onto said fiber at said first end thereof, said first launching means including means for impressing a first modulating signal having a first spectral power density distribution upon said first carrier;
second means for launching a second optical carrier of a second different wavelength onto said fiber at said second end thereof, said second launching means including means for impressing upon said second carrier a second modulating signal having a second power density distribution substantially segregated from said first power distribution;

first receiver means, coupled to said second end of said fiber, for extracting said first modulating signal from said first optical carrier;

second receiver means, coupled to said first end of said fiber, for extracting said second modulating signal from said second optical carrier; and an optical fiber amplifier connected between said first and second optical fiber segments, said optical fiber amplifier including:

pump laser means for generating optical energy of a second wavelength;

wavelength selective optical coupler means, optically coupled to said first fiber segment and to said pump laser means, for combining said optical energy of said second wavelength with optical energy of said first wavelength entering said coupler means from said first fiber segment; and doped fiber means, optically connected between said optical coupler means and said second optical fiber segment, for amplifying optical energy from said first and second fiber segments within a predetermined wavelength spectrum encompassing said first wavelength.

2. The communication link of claim 1 wherein said first launching means further includes means for impressing upon said first carrier a third modulating signal having a third spectral power distribution substantially segregated from said first or second power distributions and wherein said receiver means further includes means for extracting said third modulating signal from said first optical carrier.

3. In a fiber payout system including a vehicle, a control station, and an optical fiber having first and second segments therebetween, a bidirectional communication link comprising:

bobbin means for coupling a first end of said optical fiber to said vehicle;

first means, included within said vehicle, for launching a first optical carrier of a first wavelength onto said fiber, said first launching means including means for impressing a first modulating signal having a first spectral power distribution upon said first carrier;

second means, included within said control station for launching a second optical carrier of second different wavelength onto said fiber at a second end thereof, said second launching means including means for impressing upon said second carrier a second modulating signal having a second spectral power distribution substantially segregated from said first spectral power distribution;

first receiver means, included within said vehicle, for extracting said first modulating signal from said first optical carrier;

second receiver means, included within said control station, for extracting said second modulating signal from said second optical carrier; and an optical fiber amplifier connected between said first and second optical fiber segments, said optical fiber amplifier including:

pump laser means for generating optical energy a second wavelength;

wavelength selective optical coupler means, optically coupled to said first fiber segment and to said pump laser means, for combining said optical energy of said second wavelength with optical energy of said first wavelength entering said coupler means from said first fiber segment; and doped fiber means, optically connected between said optical coupler means and said second optical fiber segment, for amplifying optical energy from said first and second fiber segments within a predetermined wavelength spectrum encompassing said first wavelength.

* * * * *